Nov. 3, 1970  E. R. MOORE ET AL  3,537,885
FOAMED ARTICLE AND METHOD FOR THE PREPARATION THEREOF
Filed Jan. 16, 1967
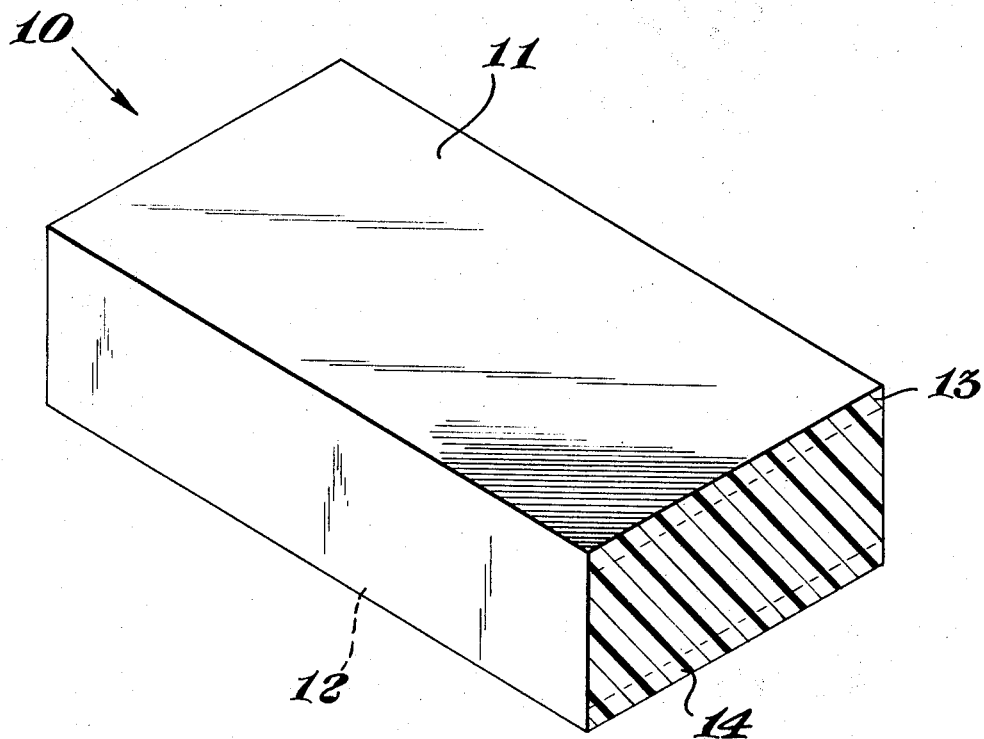
INVENTORS.
Eugene R. Moore
BY Masao Nakamura
AGENT

United States Patent Office 3,537,885
Patented Nov. 3, 1970

3,537,885
FOAMED ARTICLE AND METHOD FOR THE PREPARATION THEREOF
Eugene R. Moore and Masao Nakamura, Midland, Mich., assignors to The Dow Chemical Company, Midland, Mich., a corporation of Delaware
Filed Jan. 16, 1967, Ser. No. 609,564
Int. Cl. B44d 5/12
U.S. Cl. 117—106        11 Claims

ABSTRACT OF THE DISCLOSURE

Plastic foams are prepared from copolymers of styrene type monomers and maleic anhydride or citraconic anhydride and treated with ammonia to provide improved insulating value and chemical resistance.

---

This invention relates to a foamed article and method of preparation thereof, and more particularly relates to resinous foamed articles having improved properties and a method for the preparation of such articles.

Many synthetic resinous cellular articles are known which consist of a plurality of adjoining closed cells separated from each other by thin rigid membranes of the polymeric composition, the cells being gas filled. Such cellular bodies, or closed cell plastic foams as they are more popularly known, have found wide application in construction, packaging, flotation, decorative and other applications. One of the more popular of such plastic foams is foamed polystyrene. Foamed polystyrene suffers from a number of inherent defects. One of such defects is its sensitivity to solvents. A body of foamed polystyrene particularly in the lower density range, that is, between about 1 to 2 pounds per cubic foot is rapidly disintegrated when contacted with solvents for polystyrene. Foamed polystyrene will frequently deform under mechanical loads at temperatures of around 80 to 85° C. Such temperatures are frequently reached in locations where the foam is desirably employed as roof insulation. Oftentimes, it is desired to employ foamed polystyrene as an insulating layer in a built up roof. Oftentimes, the polystyrene foam sheet or plank is applied to a roof deck and the built up roof applied over foamed polystyrene. Great care must be taken in adhering the built up roof to the foamed polystyrene. This is particularly true when materials such as hot asphalt or heated bituminous material is used. Unless very carefully applied, these materials frequently melt and collapse the polystyrene foam. Polystyrene foam is frequently used with great benefit as a low temperature insulation for freezers, cold storage, environmental research incubators and like applications. Generally, the initial insulation value of freshly prepared polystyrene foam is greater than the insulation value of polystyrene foam that was prepared at an earlier date. This loss of insulating value requires that greater thicknesses of insulation be applied than are initially required. Polystyrene foam oftentimes is installed by using a mortar of the portland cement variety and relatively low bond strength exists between the mortar and the polystyrene. The bonding is primarily due to mechanical interlocking of the mortar with the severed cell walls of the foam sheet or plank.

It would be beneficial if there were available an improved styrene type foam plastic material which exhibited improved mortar bond strength, improved heat distortion, improved insulating valve, improved resistance to solvents and hot asphalt.

It would also be beneficial if there were available a method for the manufacture of such a closed cell plastic structure.

These benefits and other advantages in accordance with the present invention are achieved in a cellular alkenyl aromatic resinous body defining a plurality of closed, gas-filled cells and having a density less than about 10 pounds per cubic foot, the alkenyl aromatic resin containing chemically combined therein from about 5 to about 25 weight percent of maleic anhydride or citraconic anhydride or mixtures thereof, the body having at least one surface, a portion of the body adjacent at least the surface comprising the reaction product of the alkenyl aromatic-maleic anhydride composition with ammonia.

Bodies in accordance with the present invention are readily prepared in accordance with the method of the present invention which comprises providing a foamed synthetic resinous body of closed cell structure, the resinous material forming the body being a copolymer of an alkenyl aromatic monomer of the benzene series containing up to 10 carbon atoms and the vinyl group directly attached to the benzene ring and from 5 to 25 weight percent maleic anhydride chemically combined therein and subjecting the body to an atmosphere of ammonia until at least a portion of the ammonia has reacted with the copolymer.

By an "alkenyl aromatic resinous monomer" is meant a solid polymer of one or more polymerizable alkenyl aromatic compounds. The polymer or copolymer comprises, in chemically combined form, at least 50 percent by weight of at least one alkenyl aromatic compound having the general formula:

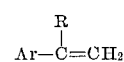

wherein Ar represents an aromatic hydrocarbon radical, or an aromatic halohydrocarbon radical of the benzene series, and R is hydrogen or the methyl radical. Examples of such alkenyl aromatic resinous monomers are the solid homopolymers of styrene, α-methylstyrene, o-methylstyrene, meta-methylstyrene, p-methylstyrene, tertiary-butylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as divinylbenzene, methylmethacrylate or acrylonitrile, etc.

The figure shows a schematic sectional view of a body in accordance with the invention.

In the figure there is depicted a foamed body generally designated by the reference numeral 10. The body 10 has a first surface 11 and a second surface 12. The body 10 is a cellular alkenyl aromatic resinous structure consisting of a plurality of closely adjacent closed cells having gas disposed therein and containing from about 5 to 25 weight percent maleic anhydride or citraconic anhydride or mixtures thereof. Adjacent a first surface 11 is a first layer 13. Adjacent the second surface 12 is a second layer 14. The first and second layers 13 and 14 are composed of the reaction product of the cellular body with ammonia.

Foam bodies in accordance with the present invention are readily prepared employing homogeneous copolymers of alkenyl aromatic resins and unsaturated anhydrides such as maleic anhydride, citraconic anhydride or mixtures thereof wherein the anahydride is generally randomly distributed throughout the copolymer molecule. Such polymerization is well known and is accomplished most readily in a recirculating coil polymerizing unit as described in U.S. Pat. 2,769,804.

"Homogeneous" refers to copolymer composition homogeneity. Such copolymers are essentially gel-free and transparent, that is, optical transmision is above 80 percent.

By fractional precipitation methods, the homogeneous copolymers are shown to have an essentially uniform copolymer distribution, that is, at least 90 percent of the copolymer will have an unsaturated anhydride component composition which does not vary more than 5 percent, with best samples not varying more than 2 percent.

Foams of the alkenyl aromatic resinous monomeranhydride copolymer are readily prepared employing conventional techniques well known in the art. Generally, it is advantageous to employ a normally gaseous blowing agent. However, a wide variety of blowing or foaming agents are readily employed. The volatile fluid foaming agents can be a saturated aliphatic hydrocarbon such as butane, isobutane, pentane, neopentane, hexane, heptane or mixtures of one or more such aliphatic hydrocarbons having a molecular weight of at least 56 and a boiling point not higher than 95° C. at 760 millimeters absolute pressure. Other suitable fluid foaming agents are the perchlorofluorocarbons such as:

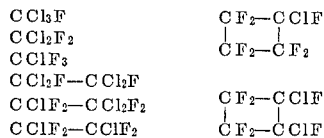

and tetraalkyl silanes such as tetramethylsilane, trimethylethylsilane, trimethylisopropylsilane and trimethyl n-propylsilane, having a boiling point not higher than 95° C. at 760 millimeters absolute pressure. The volatile fluid foaming agent is employed in amounts corresponding to form about 0.05 to 0.4 gram molecular proportion of the volatile fluid compound per 100 grams by weight of the normally solid thermoplastic polymer starting material.

The method of the present invention can be readily accomplished by exposing a synthetic resinous foamed body formed from the polymerization product of an alkenyl aromatic resinous monomer with maleic anhydride, citraconic anhydride or mixtures thereof to an atmosphere containing ammonia and beneficially, anhydrous ammonia. The ammonia may be diluted with gases such as nitrogen, oxygen, air and the like. Such an exposure may be accomplished either under atmospheric, superatmospheric or subatmospheric pressure. The ammonia diffuses into the foamed resinous body and reacts therewith presumably to form the half amide-half ammonia salt of the anhydride in the polymer chain. Beneficially, such treatment is readily carried out at temperatures from about −20° C. to the heat distortion temperature of the polymer. The particular choice of time and temperature is generally dependent upon the depth of penetration of ammonia required to give the desired properties in the resultant product and the time available for such treatment. Beneficially, for most purposes, it is advantageous to treat the foamed copolymer body with ammonia within a temperature range from about 20–75° C. and under a pressure of from about 1–1.5 atmospheres when foam bodies with a density of about 2 pounds per cubic foot are employed. The pressure of treatment is readily increased as the density of the foam body being treated increases. Usually, it is desirable to maintain the pressure of the atmosphere below the pressure which results in collapse or partial collapse of the foam cells. Oftentimes, if a soft deformable foam is required, partial collapse of the cells is desirable. However, when maximum strength is desired, collapse of the cells is undesired.

The invention is further illustrated but not limited by the following examples:

EXAMPLE 1

A copolymer of 85 weight percent styrene and 15 weight percent maleic anhydride prepared in accordance with U.S. Pat. No. 2,769,804, having a solution viscosity of about 4.5 centipoises, that is, the viscosity of a 10 weight percent solution in methylethylketone at 25° C., is extruded in a National Rubber Machinery 4.5 inch extruder. During the extrusion, 10 parts by weight per 100 parts of resin of a blowing agent are added. The blowing agent is a mixture of 25 weight percent trichlorofluoromethane and 75 weight percent methyl chloride. The extruded polymer has a density of about 2.5 pounds per cubic foot. Some one inch thick samples of the foamed extrude are placed in an air-tight enclosure containing an atmosphere of ammonia which varies in pressure from about 3 to 8 pounds per square inch gauge. Samples are exposed to the ammonia atmosphere for varying times. Some one inch samples of the foamed extrude are aged in air at 140° F. and atmospheric pressure for various periods of time and some of the samples are subsequently exposed to ammonia for varying periods of time. Each of the samples are evaluated for thermal conductivity which is expressed as a K value and represents British Thermal Units—inch/square foot-degree Fahrenheit-hour. The K values of the evaluation are set forth in Table I.

TABLE I

| | Ammonium time at 3–8 p.s.i. and room temp. | | | |
|---|---|---|---|---|
| | None | 2 hrs. | 6 hrs. | 16 hrs. |
| Aging time at 140° F.: | | | | |
| None | .221 | .246 | .248 | .233 |
| 1 day | .269 | .262 | .257 | .239 |
| 2 days | .277 | .268 | .259 | .242 |
| 5 days | .281 | .274 | .254 | .247 |
| 9 days | | .280 | .271 | .252 |
| 1 month | .295 | .285 | .277 | .257 |
| Density (lbs./ft.³) | 2.53 | 2.76 | 2.91 | 3.70 |
| Cell size (mm.) | 2.00 | 2.00 | 1.95 | 1.95 |
| Total change in K value in 1 month | 0.074 | 0.039 | 0.029 | 0.024 |

EXAMPLE 2

The procedure of Example 1 is repeated at a later date employing the same batch of polymer. The K values are set forth in Table II.

TABLE II

| | NH³ exposure time (hrs.) | |
|---|---|---|
| | 0 | 16 |
| Aging time at 140° F.: | | |
| None | .202 | .212 |
| 5 days | .251 | .233 |
| 7 days | .257 | .233 |
| Density | 2.34 | 5.57 |
| Cell size | 1.15 | 0.70 |
| Total change in K value in 7 days | 0.055 | 0.021 |

EXAMPLE 3

A polymer of styrene containing 5 percent maleic anhydride copolymerized therewith in the manner set forth in U.S. Pat. No. 2,769,804 is foamed by extrusion in the presence of 12 parts by weight of blowing agent per 100 parts of polymer. The blowing agent is 75 weight percent methyl chloride and 25 weight percent trichlorofluoroethylene. A foam is obtained having a density of 2 pounds per cubic foot and an average cell size of 0.1 millimeter. A plurality of samples 1 inch in thickness are prepared from the extruded foam. Some of the samples are subsequently exposed to anhydrous ammonia for a period of 8 hours at room temperature and atmospheric pressure. One sample of non-ammoniated foam is employed to determine thermal conductivity. Thermal conductivity also is determined after treatment. Both samples are then aged at 140° F. to accelerate the drop in thermal conductivity. Thermal conductivity and treatment are set forth in Table III.

TABLE III

| | Non-ammoniated | Ammoniated |
|---|---|---|
| Aging time at 140° F.: | | |
| None | .122 | .122 |
| 1 day | .181 | .176 |
| 5 days | .200 | .194 |
| 10 days | .222 | .216 |
| Density | 2.0 | 2.0 |

EXAMPLE 4

A copolymer of 85 weight percent styrene and 15 weight percent maleic anhydride prepared in accordance with U.S. Pat. No. 2,769,804 and having a solution viscosity of about 8 centipoise (solution viscosity is the viscosity of a 10 weight percent solution in methylethylketone at 25° C.) is extruded with 10.7 parts per 100 parts of polymer of organic blowing agent to form a foam. The blowing agent consists of 25 weight percent methyl chloride, 25 weight percent trichlorofluoromethane and 50 weight percent dichlorodifluoromethane. The foamed extrude is sliced into sheets one inch in thickness in preparation for thermal conductivity measurement. One sample is exposed to anhydrous ammonia for a period of 8 hours at atmospheric pressure and 80° C. After ammoniation, both the ammoniated foam and the non-ammoniated foam are aged at a temperature of 140° F. and the thermal conductivity determined periodically. The results are set forth in Table IV.

TABLE IV

|  | Non-ammoniated | Ammoniated |
|---|---|---|
| Aging at 140° F.: |  |  |
| None | .184 | .185 |
| 1 day | .207 | .195 |
| 5 days | .224 | .210 |
| 11 days | .230 | .216 |
| 21 days | .237 | .222 |
| 60 days | .240 | .228 |
| Density (lbs./ft.$^3$) | 2.2 | 2.2 |
| Cell size (mm.) | .90 | .92 |
| Total change in K value after 60 days | .056 | .043 |

The ammoniated and non-ammoniated foam samples are cut into specimens 1½ inches thick, 2 inches wide and 4 inches long. Two ounce portions of roofing asphalt heated to 430° F. are poured onto a surface of each sample. When the asphalt has cooled to room temperature, the non-ammoniated material shows severe surface deformation and melting which extends from about 1/16 to about 1/8 inch into the foam sample. The ammoniated sample shows no sign of surface distortion or melting. A sample of polystyrene foam having a density of 2 pounds per cubic foot is subjected to the same hot asphalt treatment. After cooling, the foam is badly deformed and the deformations extend from 3/8 to 5/8 inch into the foam.

EXAMPLE 5

The procedure of Example IV is repeated with the exception that 12.8 parts per 100 parts of blowing agent are employed. The results are set forth in Table V.

TABLE V

|  | Non-ammoniated | Ammoniated |
|---|---|---|
| Aging at 140° F.: |  |  |
| Fresh | .166 | .166 |
| 1 day | .180 | .169 |
| 5 days | .200 | .184 |
| 11 days | .206 | .192 |
| Density (lbs./ft.$^3$) | 2.5 | 2.50 |
| Cell size (mm.) | .60 | .60 |
| Total change in K value | .040 | .026 |

EXAMPLE 6

The procedure of Example 4 is repeated with the exception that a copolymer of 90 weight percent styrene and 10 weight percent maleic anhydride prepared in accordance with U.S. Pat. No. 2,769,804 is employed. A portion of the foam is exposed to ammonia and a portion of the foam remains unexposed. Two ounces of asphalt at 430° F. is applied to the ammoniated and non-ammoniated samples. The non-ammoniated sample shows severe surface melting and distortion to depths of 1/16 to 1/8 inch. The ammoniated sample shows only slight surface distortion to a depth of about 1/32 inch.

EXAMPLE 7

In a manner similar to Example 3, a copolymer of 75 weight percent styrene, 25 weight percent maleic anhydride prepared in accordance with U.S. Pat. No. 2,769,804 is foamed employing 12 parts of blowing agent per 100 parts of polymer. The blowing agent is 50 weight percent methyl chloride and 50 weight percent methylene chloride. The foam has a density of about 2.1 pounds per cubic foot. A portion of the resultant foam with the initial extrusion surface removed is placed in an ammonia atmosphere at 80° C. for 24 hours. Analysis of the resultant sample by neutron activation analysis for nitrogen, indicates absorption of at least 1 mol of ammonia per mole of anhydride present in the copolymer. Ammoniated and non-ammoniated samples are cut to test sections 1" x 1" x 4" and exposed to 100 percent relative humidity at 60° C. for 91 hours. The ammoniated sample increases in length to 4 1/16 inches, while the non-ammoniated sample increases to 4 1/32 inches in length. The samples are then placed in a vacuum oven having a temperature of 213° C. and a pressure of 8 millimeters of mercury for a period of 2 hours. The ammoniated sample lost 18.2 percent of its weight. The weight loss of the non-ammoniated sample is 4.5 percent.

EXAMPLE 8

A foamed polymer of 85 weight percent styrene, 15 weight percent maleic anhydride prepared according to U.S. Pat. No. 2,769,804 and a polystyrene foam are prepared employing the conditions and blowing agent mixture of Example 3. Each product has a density of 2 pounds per cubic foot in a cell size of about 0.5 millimeter. Each foam product is cut to remove any surface skin and the styrene maleic anhydride foam is exposed to anhydrous ammonia at atmospheric pressure at 60° C. for a period of 2 hours. The depth of penetration of the ammonia into the foam is determined by submerging a section of the treated foam into toluene. The foam that is reacted with ammonia is insoluble in toluene. The unreacted material is dissolved within about 30 seconds. The depth of penetration of ammonia into the foam is about 0.451 inch. Bond strength of a portion of the polystyrene sample and the ammoniated styrene maleic anhydride sample are determined with gypsum plaster and portland cement plaster. With gypsum plaster, the ammoniated styrene maleic anhydride foam exhibits a bond strength of 21.2 pounds per square inch. The polystyrene foam has a bond strength of only 12.8 pounds per square inch. With portland cement, the ammoniated styrene maleic anhydride foam exhibits a bond strength of 30.4 pounds per square inch, while the polystyrene foam shows a strength of 22.1 pounds per square inch.

EXAMPLE 9

Two samples of foam are prepared, both from polymer prepared in accordance with U.S. Pat. No. 2,769,804. One sample contains 10 weight percent maleic anhydride and 90 weight percent styrene. The other sample contains 15 weight percent maleic anhydride and 85 weight percent styrene. Each of the foams are cut into a plurality of cubes measuring 2 inches on the side. Four sides of each cube are covered with an epoxy resin and aluminum foil. One end of the cube is cut to remove the skin left by extrusion and the opposite end of the cube has the extrusion skin exposed. The cubes are placed in an atmosphere of ammonia for varying times at different temperatures to determine the penetration of ammonia at the skinless or cut end and the uncut end. The cubes are subsequently sectioned into slices of 1/16 inch in thickness and placed in toluene, the undissolved portion of the slice representing the depth of penetration of the ammonia. The results of the experiments are set forth in the following table.

TABLE VI

| Sample styrene/maleic anhydride by weight | Time in oven, hrs. | Temp., °C. | Depth penetration, inches |
|---|---|---|---|
| 90-10 copolymer skin side | ½ | 60 | 0.046 |
| | 1 | 60 | 0.097 |
| | 2 | 60 | 0.148 |
| | 4 | 60 | 0.245 |
| | ½ | 80 | 0.075 |
| | 1 | 80 | 0.160 |
| | 2 | 80 | 0.267 |
| | 4 | 80 | 0.405 |
| | ½ | 100 | 0.128 |
| | 1 | 100 | 0.169 |
| | 2¼ | 100 | 0.379 |
| | 4 | 100 | 0.399 |
| 90-10 copolymer cut side | ½ | 60 | 0.279 |
| | 1 | 60 | 0.314 |
| | 2 | 60 | 0.451 |
| | 4 | 60 | 0.554 |
| | ½ | 80 | 0.292 |
| | 1 | 80 | 0.432 |
| | 2 | 80 | 0.600 |
| | 4 | 80 | 0.819 |
| | ½ | 100 | 0.315 |
| | 1 | 100 | 0.394 |
| | 2¼ | 100 | 0.747 |
| | 4 | 100 | 0.837 |
| 85-15 copolymer skin side | ½ | 60 | 0.019 |
| | 1 | 60 | 0.023 |
| | 2 | 60 | 0.049 |
| | 4 | 60 | 0.071 |
| | ½ | 80 | 0.023 |
| | 1 | 80 | 0.042 |
| | 2 | 80 | 0.068 |
| | 4 | 80 | 0.227 |
| | ½ | 100 | 0.028 |
| | 1 | 100 | 0.065 |
| | 2 | 100 | 0.121 |
| | 4 | 100 | 0.364 |
| 85-15 copolymer cut side | ½ | 60 | 0.197 |
| | 1 | 60 | 0.259 |
| | 2 | 60 | 0.382 |
| | 4 | 60 | 0.453 |
| | ½ | 80 | 0.243 |
| | 1 | 80 | 0.341 |
| | 2 | 80 | 0.406 |
| | 4 | 80 | 0.697 |
| | ½ | 100 | 0.329 |
| | 1 | 100 | 0.462 |
| | 2 | 100 | 0.532 |
| | 4 | 100 | 0.896 |

Equally beneficial results are achieved when the procedure of the foregoing examples is repeated wherein the maleic anhydride is wholly or partially replaced by citraconic anhydride.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A cellular alkenyl aromatic resinous body defining a plurality of closed, gas-filled cells, the body having a density of less than about 10 pounds per cubic foot, the alkenyl aromatic resin containing chemically bound therein from about 5 to about 25 weight percent of maleic anhydride or citraconic anhydride or mixtures thereof, the body defining at least one surface, a portion of the body adjacent at least the surface of the foam body comprising the reaction product of the alkenyl aromatic maleic anhydride composition with ammonia.

2. The product of claim 1 wherein at least one mol of ammonia per mol of anhydride is present in the composition.

3. The body of claim 1 wherein the density of the cellular article is from about 1 to 3 pounds per cubic foot.

4. The body of claim 1 wherein the alkenyl aromatic resin is a copolymer of styrene and maleic anhydride.

5. The body of claim 1 having a generally sheet-like configuration.

6. A method for the treating of foamed synthetic resinous bodies comprising:
   providing a foamed synthetic resinous body having a plurality of closed cells therein,
   a resinous material forming the body being a copolymer of an alkenyl aromatic monomer of the benzene series containing up to 10 carbon atoms and a vinyl group attached to the benzene ring and from 5 to 25 weight percent maleic anhydride or citraconic anhydride or mixtures thereof chemically combined therein,
   subjecting the body to an atmosphere of ammonia until at least a portion of the ammonia has reacted with the copolymer.

7. The method of claim 6 wherein the cellular body is exposed to a superatmospherical pressure of ammonia.

8. The body of claim 6 wherein the alkenyl aromatic monomer is styrene.

9. The method of claim 6 wherein the cellular body is exposed to the ammonia atmosphere until at least one mol of ammonia per mol of anhydride is present in at least a surface portion of the foam.

10. The method of claim 6 wherein the cellular body is contacted with the ammonia atmosphere at a temperature of from about −20° C. to about the heat distortion temperature of the polymer.

11. The method of claim 6 wherein the body has a density of about 1 to 3 pounds per cubic foot and is treated under a pressure of from about 1 to 1.5 atmospheres.

References Cited
UNITED STATES PATENTS

| 2,047,398 | 7/1936 | Voss et al. | |
| 2,576,977 | 12/1957 | Stober | 260—2.5 |
| 2,876,894 | 3/1959 | Dahlquist. | |

ALFRED L. LEAVITT, Primary Examiner

J. A. BELL, Assistant Examiner

U.S. Cl. X.R.

117—62, 106; 260—2.5